United States Patent
Chang et al.

(10) Patent No.: US 6,631,548 B2
(45) Date of Patent: Oct. 14, 2003

(54) SIMULTANEOUS SLIDER CROWN AND CAMBER ADJUST BY SCRIBE LINE CONTROL

(75) Inventors: Ping-Wei Chang, San Jose, CA (US); Chie Ching Poon, San Jose, CA (US); Andrew C. Tam, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/916,855

(22) Filed: Jul. 27, 2001

(65) Prior Publication Data

US 2003/0019095 A1 Jan. 30, 2003

(51) Int. Cl.⁷ .............................. G11B 5/127
(52) U.S. Cl. .................. 29/603.09; 29/603.12; 29/603.16
(58) Field of Search ............. 29/407.01, 407.05, 29/407.09, 593, 603.09, 603.12, 603.16, 603.17, 603.18; 219/121.68, 121.69, 121.73

(56) References Cited

U.S. PATENT DOCUMENTS

| | | | |
|---|---|---|---|
| 5,266,769 A | 11/1993 | Deshpande et al. | |
| 5,442,850 A | 8/1995 | Kerth | |
| 5,687,042 A | 11/1997 | Chhabra et al. | |
| 5,713,123 A | 2/1998 | Toyoda et al. | |
| 5,982,583 A | 11/1999 | Strom | |
| 6,075,604 A | 6/2000 | Crawforth et al. | |
| 6,107,599 A | 8/2000 | Baumgart et al. | |
| 6,108,170 A | 8/2000 | Crawforth et al. | |
| 6,321,440 B1 | 11/2001 | Crawforth et al. | |

OTHER PUBLICATIONS

U. S. Patent Application Ser. No. 09/277,862, filed on Mar. 26, 1999, entitled, "Method For Manufacture of Sliders", invented by Yu–En Percy Chang; Yuri Igor Markevitch; and Scott Thomas.

Tam, A.C. et al. "Stress on the Dotted Line", from *Data Storage Technology & Manufacture of Storage Devices*, IBM Corp., Dec. 1999, pp. 29–38.

Tam, A.C. et al. "Research Report *New Laser Curvature Adjust Technique (LCAT) For Precise Adjustment of the Crown And Camber of Magnetic Head Sliders*", IBM, Corp., RJ 10158 (95033), Sep. 2, 1999, pp. 1–32.

Tam, A.C. et al. "New Laser Curvature Adjust Technique (LCAT) For Fine Adjustment of the Crown And Camber of Magnetic Head Sliders", Insight, May/Jun. 2000, pp. 8, 10–12.

U.S. Patent Application Ser. No. 09/916,851, filed Jul. 27, 2001, entitled "Control of Twist, Crown and Camber for Sliders Using Location Sensitive Scribing", invented by Chie C. Poon, Ping–Wei Chang, Andrew C. Tam and John W. Raniseski.

(List continued on next page.)

*Primary Examiner*—Gregory Huson
*Assistant Examiner*—Peter deVore
(74) *Attorney, Agent, or Firm*—Alan S. Raynes; Konrad Raynes Victor & Mann LLP

(57) ABSTRACT

Methods for adjusting the curvature of a slider may include providing a first slider including an air bearing surface and a back surface opposite the air bearing surface. The camber and crown of the first slider are measured, and a plurality of scribes are made at positions on the back surface of the first slider. The change in camber and crown due to each scribe on the first slider is measured. The scribe position and change in crown and camber per position is recorded in a data structure. A second slider is provided, the second slider including an air bearing surface and a back surface opposite the air bearing surface. The camber and crown of the second slider are measured. A desired amount of change in crown and camber is determined. Scribe positions are selected based on information from the data structure so that the desired amount of change in crown and camber will be obtained. The back surface of the second slider is scribed at the selected scribe positions.

26 Claims, 10 Drawing Sheets

OTHER PUBLICATIONS

U.S. Patent Application Ser. No. 09/916,856, filed Jul. 27, 2001, entitled "Enhanced Twist Adjust Range With Scribed Lines For Slider Curvature Adjust", invented by Chie C. Poon, Ping–Wei Chang and Andrew C. Tam.

U.S. Patent Application Ser. No. 09/192,636, filed Nov. 16, 1998, having docket no. SA9–98–177.

U.S. Patent Application Ser. No. 09/253,671, filed Feb. 19, 1999, having Patent Application Publication No. US 2002/0023071 A1, published Feb. 21, 2002.

copy of viewgraphs from presentation by Tam et al., entitled "A New Laser Curvature Adjuct Technique (LCAT) for Fine Control of Crown and Chamber of Magnetic Head Sliders", presented at DISKCON 1999, San Jose, CA (Sep. 23, 1999).

videotape of presentation by A. Tam, entitled "Fine Adjustment of the Flatness of Head Sliders Using Laser Cutting Controlled by In–Situ Curvature Monitor", presented at DISKCON Japan 1999, Tokyo, Japan (Apr. 14–16, 1999).

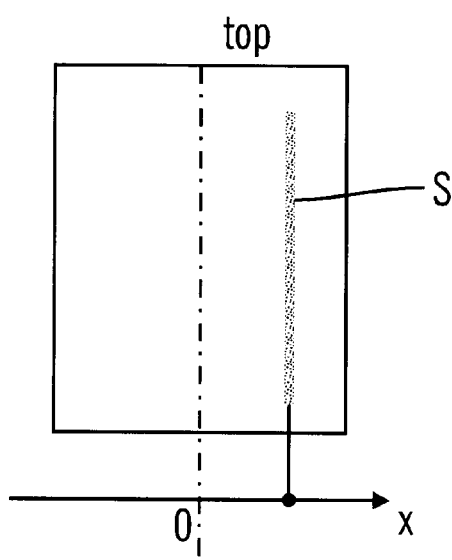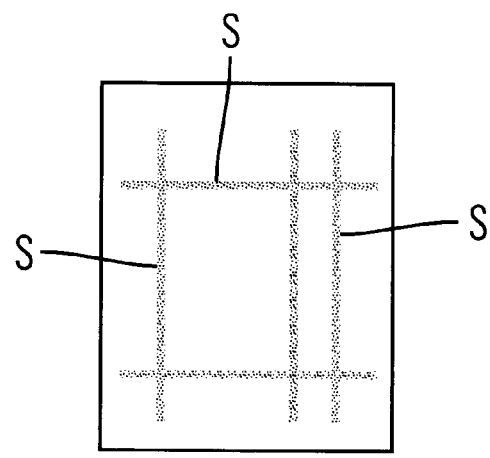
FIG. 5(a)
FIG. 5(b)

FIG. 9

SIMULTANEOUS SLIDER CROWN AND CAMBER ADJUST BY SCRIBE LINE CONTROL

FIELD OF THE INVENTION

Embodiments of the present invention relate generally to disk drive systems and to the manufacture of slider devices used in the disk drive system. More particularly, certain embodiments relate to methods for controlling the adjustment of crown and camber of sliders using scribing.

DESCRIPTION OF RELATED ART

Magnetic storage systems typically include a rotatable magnetic disk having concentric data tracks defined for storing data, and a magnetic recording head or transducer for reading data from and writing data to the various data tracks. In typical disk drive systems, a stack of one or more magnetic disks is mounted over a spindle on a drive motor. The system also includes a head actuator for moving the magnetic recording head relative to the disk surfaces, and electronic circuitry for processing signals to implement various functions of the disk drive.

The head is attached to a carrier or slider having an air bearing surface which is supported during operation adjacent to the data surface of the disk by a cushion of air generated by the rotating disk. The terms "head" and "slider" are sometimes both used to refer to the slider having a head attached thereon. The slider design affects the efficiency, density, speed and accuracy with which the data can be read and written to the disk. Recording density generally depends on the separation distance between the recording element of the head and the disk. Lower flying heights are usually desired to achieve high areal density recording. As flying height is reduced, it becomes increasingly difficult to maintain the flying height accuracy to the degree necessary for reliable reading and recording of data. In addition, lower flying heights can lead to undesirable interactions between the head and the disk.

As the disk typically includes a hard carbon coating, the slider is typically fabricated from a hard ceramic material so that any interactions between the disk and air bearing surface of the slider will not result in premature wear or breakage of the slider. In addition, the slider material should be relatively inert so that no chemical reactions take place on the air bearing surface. As illustrated in FIG. 1, sliders are usually derived from a wafer 10 made from a ceramic material such as a mixture of aluminun oxide ($Al_2O_3$) and titanium carbide (TiC). The components of each read/write device are formed or deposited on a surface 12 of the wafer 10 and the wafer 10 is diced into rows such as row 20 illustrated in FIG. 2. The row 20 has an end surface 12 having the read/write device and a row face that is processed, usually by polishing and/or etching, to form an air bearing surface 18. The row 20 is then diced into individual sliders 30 having an air bearing surface 18 and a read/write device surface 12 on which the read/write device is typically located at a central position 32, as illustrated in FIG. 3. The end surface 12 of the slider at the position where the read/write device is located may also be known as the trailing edge. FIG. 4a illustrates a slider 30 having a leading edge 14, a trailing edge 12, an air bearing side 18, a back or flex side 22, and x and y directions. FIG. 4b illustrates a side view of the slider 30 from the y direction and shows a disk 40 over which the slider 40 flies.

The slider is often formed with an aerodynamic pattern of protrusions (air bearing pattern) on the air bearing surface which enable the slider to fly at a constant height close to the disk during operation of the disk drive. It has been found that several important characteristics of the slider related to obtaining the desired flying characteristics for the slider are crown, camber and twist. These characteristics relate to the curvature of the slider. Crown is the deviation from an imaginary planar air bearing surface in the direction of air flow (x-direction, or leading edge to trailing edge), with a concave air bearing shape defined as negative crown and a convex shape defined as positive crown. Similarly, camber is the deviation from the same imaginary planar surface in the y-direction (normal to the direction of air flow). A concave shape is defined as negative camber and a convex shape is defined as positive camber. The crown is the maximum spacing between the surface of back side 22 and the dotted line in FIG. 4b, which is along the x-direction. Similarly, the camber is the maximum spacing between the back surface and a dotted line along the y-direction. Twist is the difference between diagonal curvatures. For typical slider designs, neither negative crown nor negative camber of the air bearing surface is desired because it leads to variations in the slider flying height and also makes it more likely that the edges and corners of the slider will damage the recording medium should there be contact between them.

Adjusting any one parameter of the crown and camber can lead to changes in the other parameters, as they all pertain to the same surface. It has been difficult to control these parameters because when an operation is carried out to control one parameter, the other may change in an unpredictable and undesirable manner.

SUMMARY

Embodiments include methods for adjusting the curvature of a slider.

Certain embodiments relate to methods including providing a first slider including an air bearing surface and a back surface opposite the air bearing surface. The camber and crown of the first slider are measured, and a plurality of scribes are made at positions on the back surface of the first slider. The change in camber and crown due to each scribe on the first slider is measured. The scribe position and change in crown and camber per position is recorded in a data structure. A second slider is provided, the second slider including an air bearing surface and a back surface opposite the air bearing surface. The camber and crown of the second slider are measured. A desired amount of change in crown and camber is determined. Scribe positions are selected based on information from the data structure so that the desired amount of change in crown and camber will be obtained. The back surface of the second slider is scribed at the selected scribe positions.

Embodiments may also relate to a method for adjusting slider curvature including providing a first row of sliders, measuring the camber and crown of the first row of sliders, and making scribes at selected positions on the first row of sliders. The change in camber and crown due to the scribes made on the first row of sliders is measured. The method also includes recording in a data structure the selected positions and the change in crown and camber per selected position. A second row of sliders is provided and the camber and crown of the second row is sliders is measured. A desired amount of change in crown and camber on the second row of sliders is determined. Scribe positions are selected based on information from the data structure so that the desired amount of change in crown and camber will be obtained; and the second row of sliders are scribed at the selected scribe positions.

Embodiments may also include updating the data structure from the first set of sliders using the position specific changes in crown and camber from a second and any subsequent sets of sliders. The data structure, including any number of updates, may provide representative changes in crown and camber for the particular slider type.

BRIEF DESCRIPTION OF THE DRAWINGS

Embodiments of the invention are described with reference to the accompanying drawings which, for illustrative purposes, are schematic and not necessarily drawn to scale.

FIGS. 5a and 5b illustrate laser scribe line designs according to embodiments of the present invention.

FIG. 9 illustrates a table showing scribe line locations to obtain the target values for the crown and camber for the sliders in FIG. 8.

DETAILED DESCRIPTION

Preferred embodiments of the present invention are described with reference to FIGS. 5–11. While the invention is described in terms of the best mode for achieving this invention's objectives, it will be appreciated by those skilled in the art that variations may be accomplished in view of these teachings without deviating from the spirit or scope of the invention.

Certain preferred embodiments of the present invention provide methods for adjusting crown and camber by manipulating the location and number of scribe lines on the flex side of the slider. The crown and camber can be adjusted by predetermined amounts and in a predictable manner, by controlling the scribe location and the number of scribes.

As seen in FIG. 5(a), a coordinate frame can be superimposed on the slider flex (back) side, and scribe lines S can be referenced and positioned using a device such as, for example, that described in U.S. Pat. Nos. 6,075,604 and 6,108,170, each of which is hereby incorporated by reference in its entirety. As seen in FIG. 5(a), an x-y coordinate frame is shown, where a single vertical laser scribe line S has been made that extends from a location close to the trailing edge (top) to the leading edge (bottom). FIG. 5(b) illustrates both vertical and horizontal scribe lines S superimposed on each other.

Figure 1:
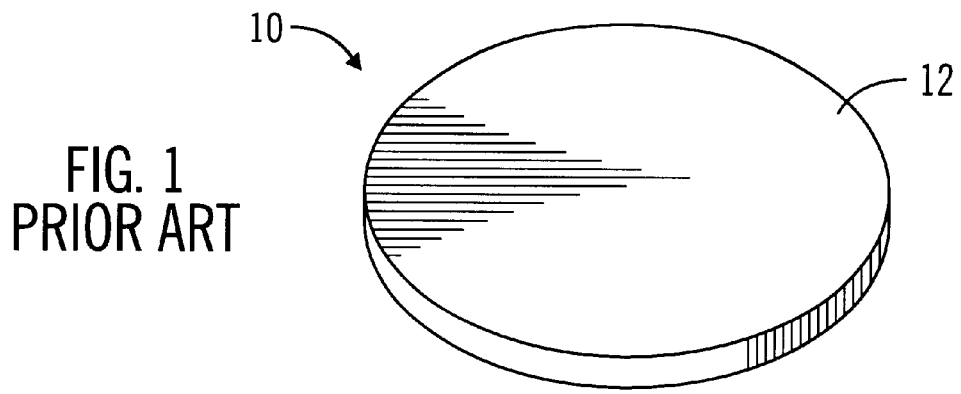
FIG. 1 is a perspective view of a wafer from which a plurality of sliders may be manufactured.
Figure 2:
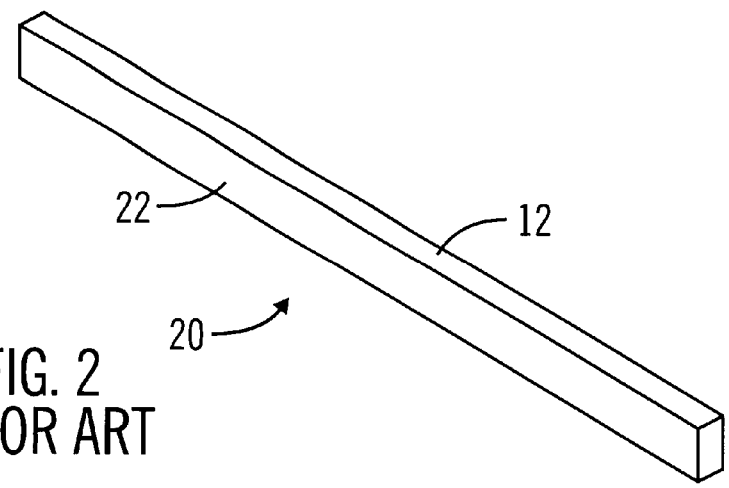
FIG. 2 is a perspective view of a row cut from the wafer of FIG. 1 during slider manufacturing.
Figure 3:
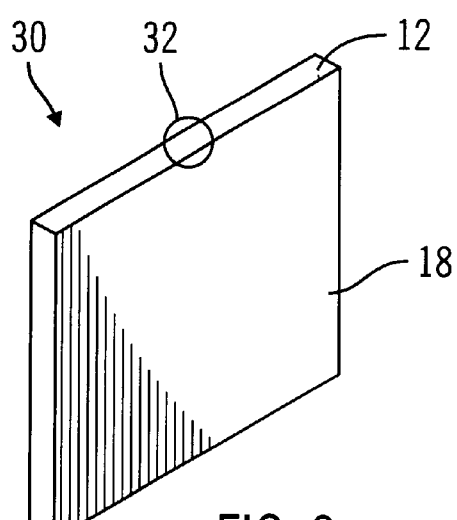
FIG. 3 is a perspective view of an individual slider component diced from the row of FIG. 2.
Figure 4A:
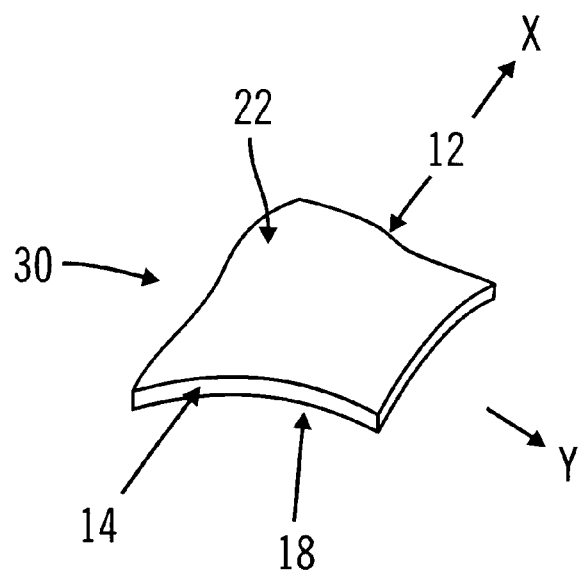
FIGS. 4a and 4b illustrate slider curve parameters and the relationship between a slider and an disk surface.
Figure 4B:
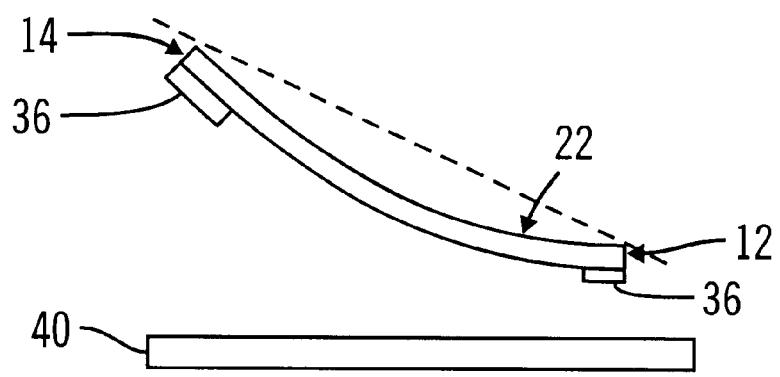
Figure 6:
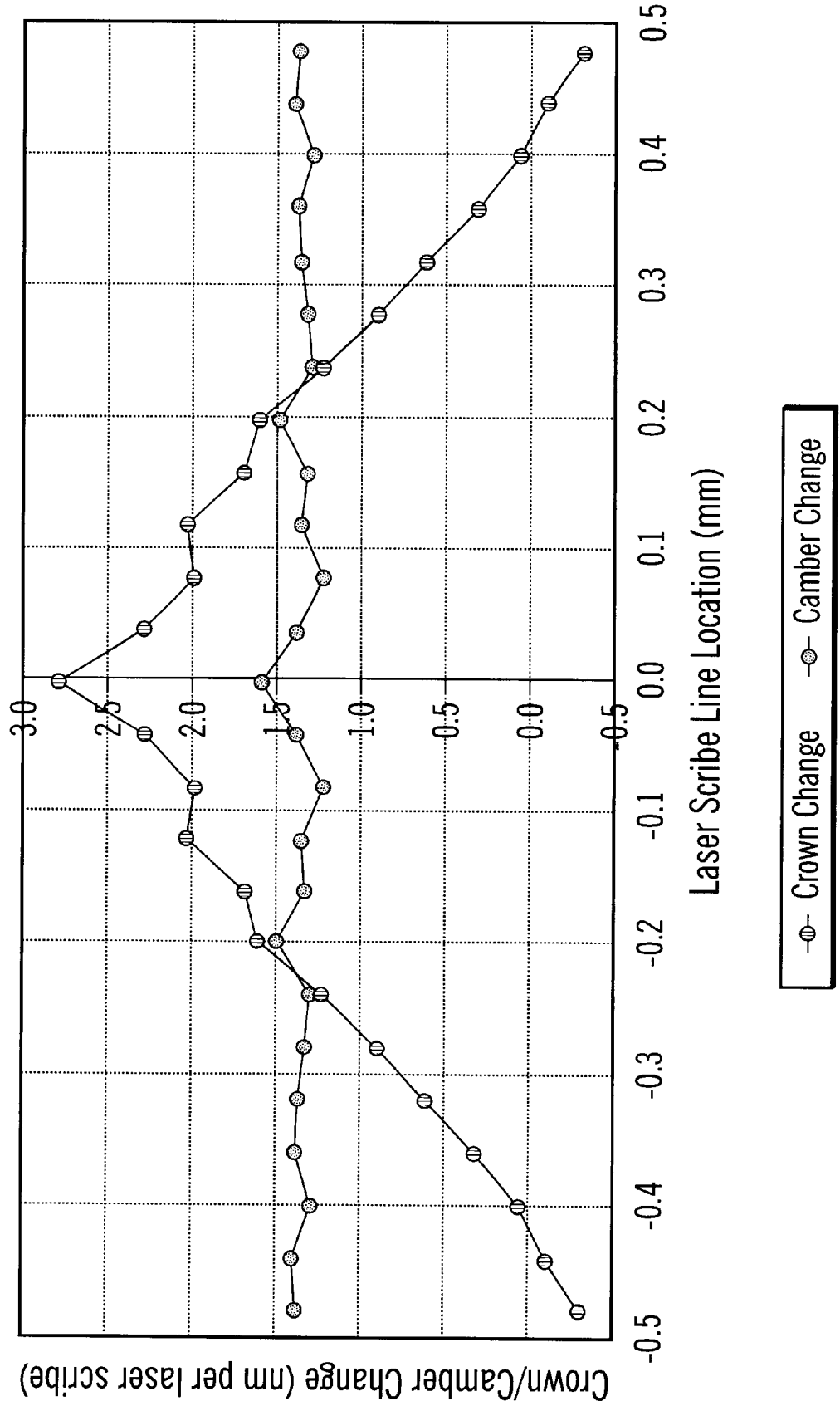
FIG. 6 illustrates crown and camber change as a function of scribe line location in accordance with an embodiment of the present invention.

FIG. 6 illustrates scribe line locations versus crown and camber change for vertical laser scribes on a test sample which has two diagonal scribes on the flex side. A homogeneous crown increase and non-homogeneous camber change was observed. The strong location dependency for camber and weak location dependency for crown permits the independent adjustment of the crown and camber. In this example, 13 laser scribe lines were made in sequence, including a scribe line at the center of the slider (the 0.0 position), and 12 scribe lines at 0.04 mm intervals towards one side of the slider. The data was then mirrored around the center line to create the symmetrical plot of FIG. 6. As seen from the data, the crown change was relatively constant regardless of the location of the scribe line. The camber change, on the other hand, varied greatly, with the greatest camber change at the center line and decreasing amounts of camber change as the scribe lines approach the sides of the slider.

From the data of FIG. 6, a number of methods can be used for achieving simultaneous crown and camber adjustment. One method includes the construction of a mapping such that a pair of entries of desired crown and camber change will map to one or more unique laser scribe patterns, with such change being predicted based on previous data. The construction of the mapping may begin by counting all possible crown and camber changes for all laser scribe patterns from the curves shown in FIG. 6. For example, for a total of 25 locations spaced 0.04 mm apart, each location can be independently laser scribed or not, which yields a total combination of 25 independent ON/OFF binary switches for a total of $2^{25}$=33,554,432 possibilities. Each of the possibilities yields a crown and camber change.

Mathematically, the total changes can also be represented as below for crown and camber change:

total crown change=$F1*N1+F2*N2+ \ldots +F25*N25$ (Eq. 1 crown)

total camber change=$G1*N1+G2*N2+ \ldots +G25*N25$(Eq. 1 camber)

where Fn is the crown change from scribe number n at location n, n=1, ... 25; where Gn is the camber change from scribe number n at location n, n=1, ... 25; where Nn (where n=1, ... 25) is either 0 or 1; 0 means the indexed location received no laser scribe, 1 means the indexed location received a scribe; and where the center scribe is at n=13.

The sequence N1, ... , N25 can be generalized to take on any real (or fractional) values rather than binary to represent fractional laser scribe lines (shorter scribe lines). The total curvature change can be computed from a mapping of the scribes by sequentially indexing through all admissible combinations of (N1, N2, ... , N25). Consider the case when each N1, N2, ... , N25 is either 0 or 1. When N25 is reached, the value simply becomes a 25-bit binary number. Let this 25-bit binary number sequentially iterate from 1 to $2^{25}$, and calculate the corresponding crown and camber change according to Eq. 1 at each iteration. We then obtain the numerical equivalent of the mapping from scribe pattern to crown or camber change. The information can be entered into a data structure, and the iterative calculations and mapping can be easily handled by computer. In mathematical terms, it is preferred that subsets of the domain and range of the mapping should be selected so that the mapping becomes a one-to-one and therefore inversible. Selection of such subsets may be based on an engineering criterion such as balanced left and right scribe pattern for easy implementation and also symmetric bending of the slider, yet still achieving sufficient resolution. In such an example, providing that an admissible scribe pattern is always symmetric about the center scribe location N13 can be carried out by adding the following logic check at each iteration:

IF (N1=N25) AND (N2=N24) . . . AND (N12=N14)
  THEN record the mapping and do crown and camber change calculation
  ELSE ignore this scribe pattern.

Figure 7:
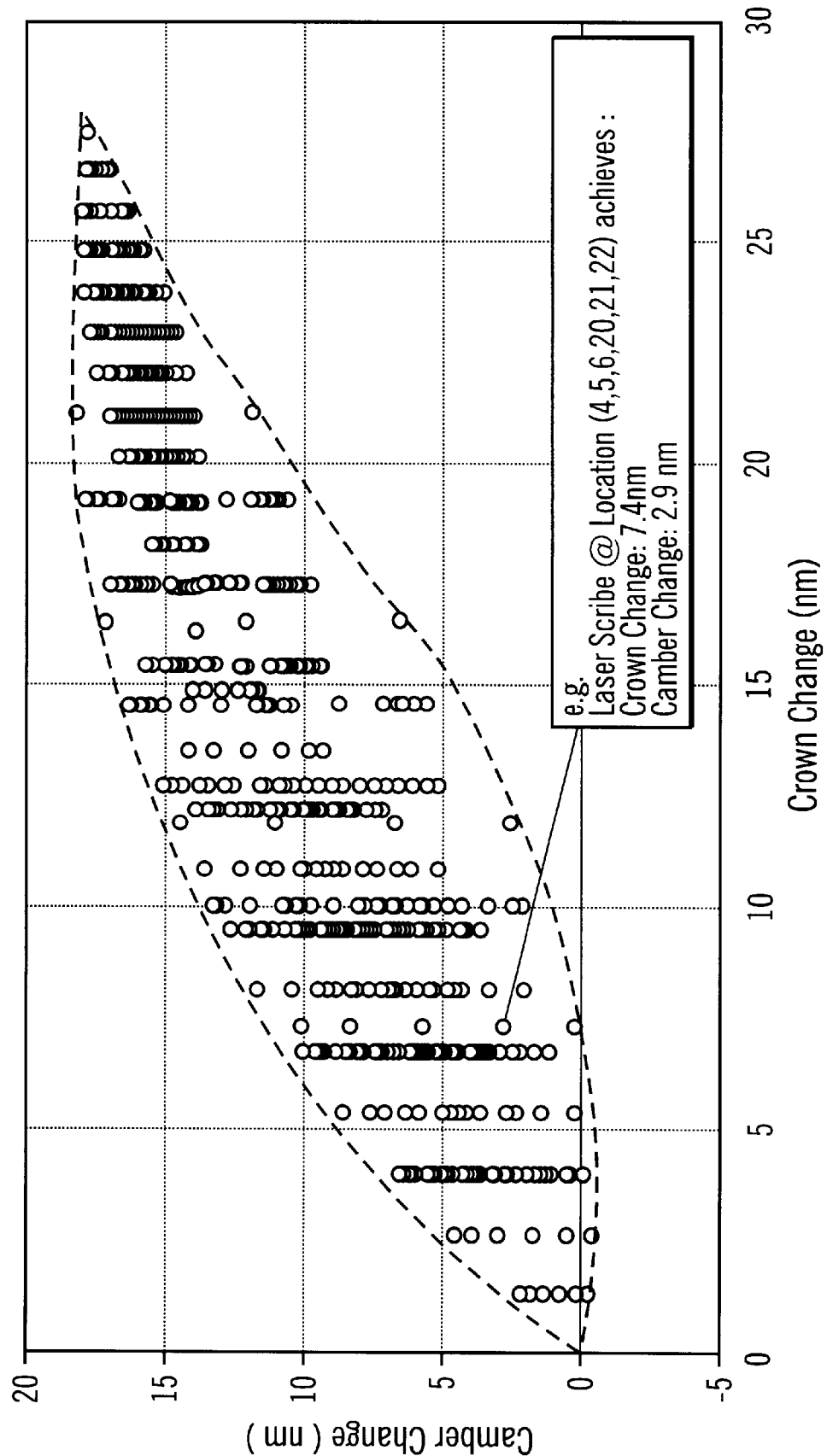
FIG. 7 illustrates a group of admissible crown and camber change combinations obtained from the data of FIG. 6.

The actual data points plotted in FIG. 7 represent such a symmetric subset of all admissible scribe patterns, which in most cases produces a sufficiently dense mapping from scribe pattern onto respective crown and camber changes. Once this mapping from scribe pattern to crown/camber change is established, a reverse mapping is readily obtained by simply indexing the crown/camber change combination to retrieve the needed scribe pattern, i.e., the values of (N1, N2, . . . , N25). Further, this reverse mapping actually consists of discretely populated grid points. Any point (meaning crown/camber change) falls within a grid that can be interpolated to retrieve a scribe pattern with even finer resolution, if fractional scribe lines are utilized.

FIG. 7 exhibits a mapping of 680 entries out of the $2^{25}$ possibilities, as camber change versus crown change. The crown and camber can thus be modified to values within the curve of FIG. 7 by indexing the closest point corresponding to the desired crown and camber change. Such indexing can be simplified though the use of a computer assisted look-up table scheme. The example indicated in the box in FIG. 7 shows that to obtain a crown and camber changes of 7.4 and 2.9 nm, respectively, one should scribe at locations 4, 5, 6, 20, 21,22, i.e., N1=N2=N3=0,
N4=N5=N6=1,
N1=N2=N3=N7=N8=N9=N10=N11=N12=N13=N14=N15=N16=N17=N18=N19=0,
N20=N21=N22=1, and
N23=N24=N25=0.

Figure 8:
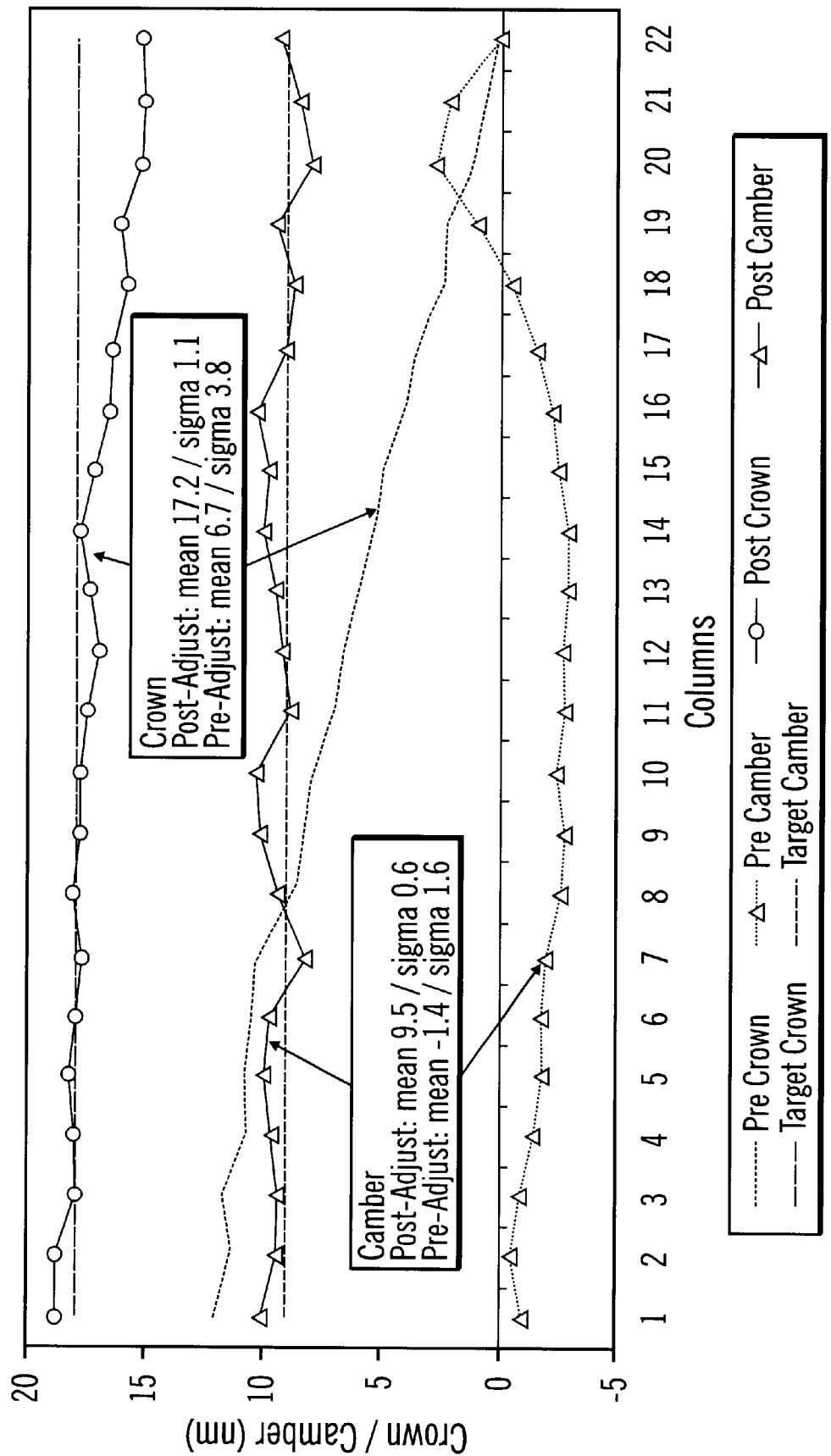
FIG. 8 illustrates crown and camber values for sliders before and after adjustment in accordance with an embodiment of the present invention.
Figure 9:
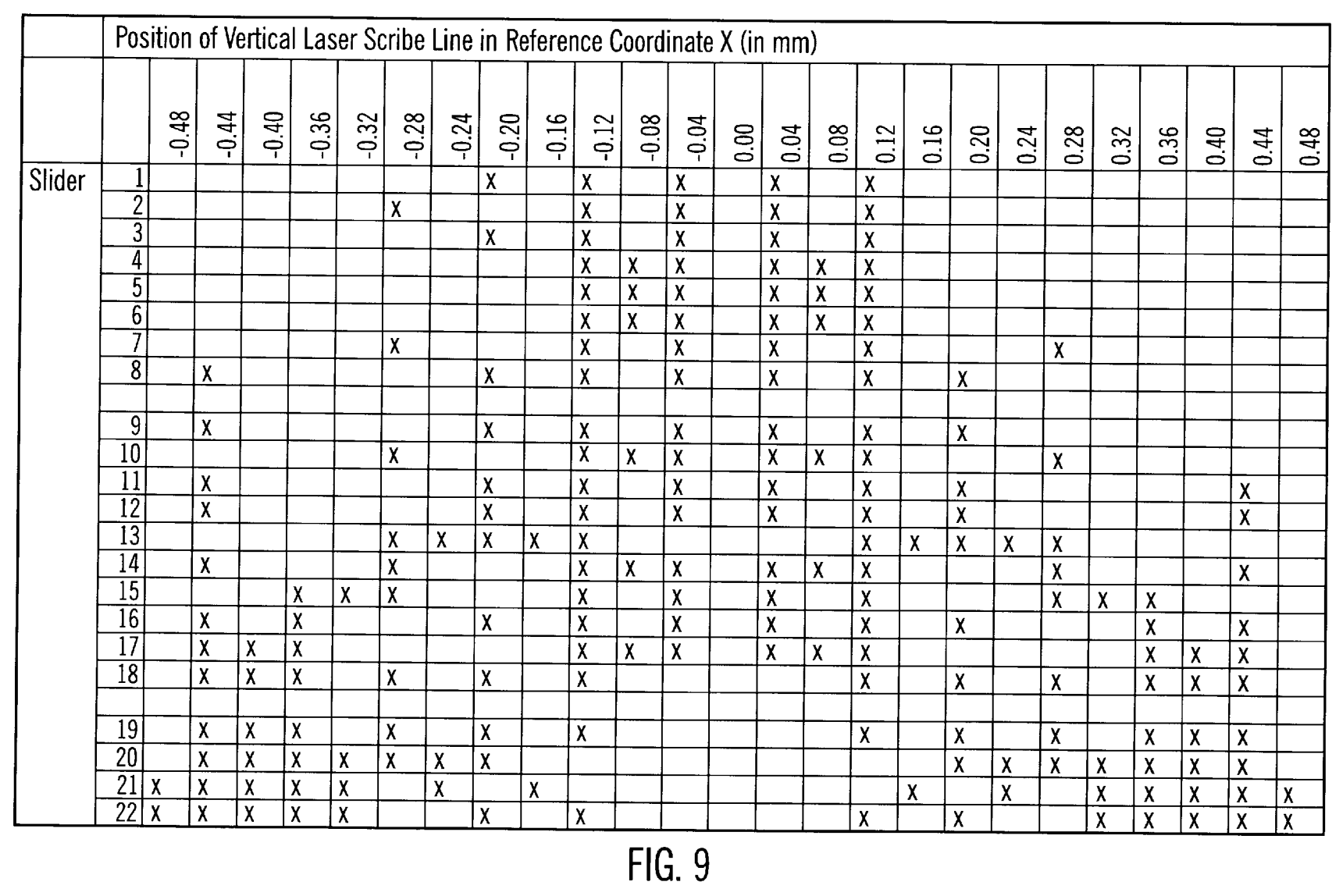

FIG. 8 illustrates crown and camber values for sliders before and after adjustment using the above method. The average pre-adjust camber value was −1.4 nm and the standard deviation was 1.6 nm. The average pre-adjust crown value was 6.7 nm and the standard deviation was 3.8 nm. The target value for crown was 18 nm and for camber was 10 nm. Using a computer table lookup, scribe line cut patterns to obtain the above target values were determined as illustrated in the table of FIG. 9. The scribe lines were made using a YAG laser have a 1064 nm wavelength, at 140 kHz, 3.5 W power, and a 10 ms scan time per scribe of 1 mm length. The post-adjust values as shown in FIG. 8, and were 9.5 nm with a standard deviation of 0.6 for crown and 17.2 nm with a standard deviation of 1.1 for camber. These values are very close to the target values.

Variation in slider fabrication process control can result in variations of crown and camber responsiveness to laser scribe lines. For even more precise adjustment, multiple installments, where each installment is given respective sub-targets on crown and camber, can be carried out. Thus, actual crown and camber responsiveness to laser scribes of the targeted sliders can be determined in-situ and process variation can be compensated for by, for example, a method such as that described in U.S. Pat. No. 6,075,604, which is hereby incorporated by reference in its entirety.

Figure 10:
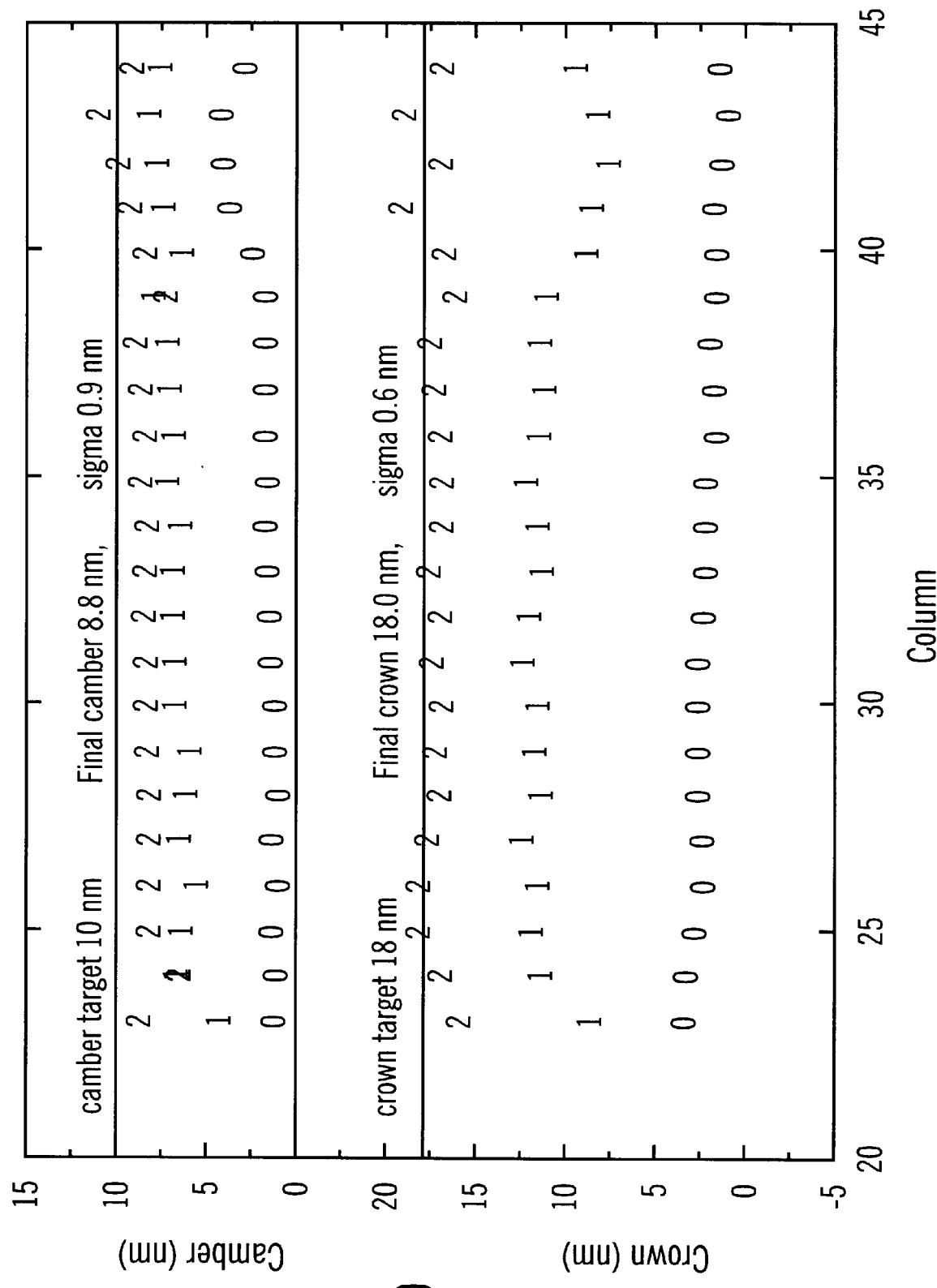
FIG. 10 illustrates the results of a two installment process for forming scribe lines for the simultaneous adjust of crown and camber on a half row of sliders in accordance with an embodiment of the present invention.

A two installment process was carried out and the results illustrated in FIG. 10, which shows the simultaneous adjust of crown and camber on a half row of sliders. The reference numbers 0, 1 and 2 in the figure represent the initial, first installment, and second (final) installment values. As seen in FIG. 10, the target values were 18 nm for crown and 10 nm for camber, and the final values obtained were 18.0 nm with a standard deviation of 0.6 nm for crown and 8.8 nm with a standard deviation of 0.9 for camber.

Figure 11A:
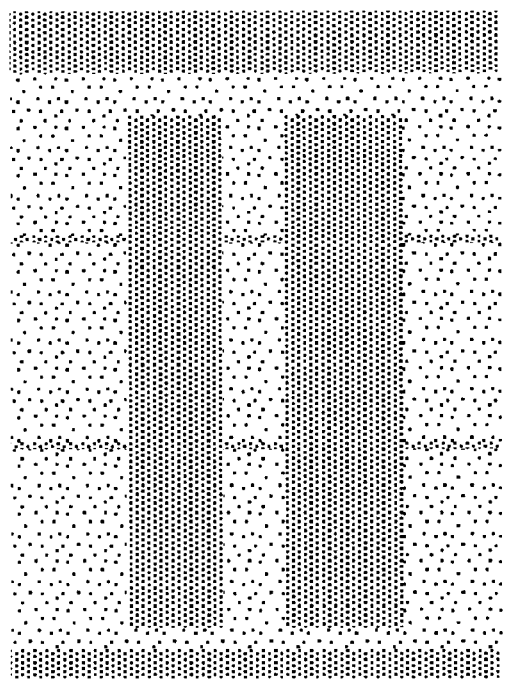
FIGS. 11(a) and 11(b) illustrate two patterns of vertical laser scribes on the flex side of a slider in accordance with embodiment of the present invention.
Figure 11B:
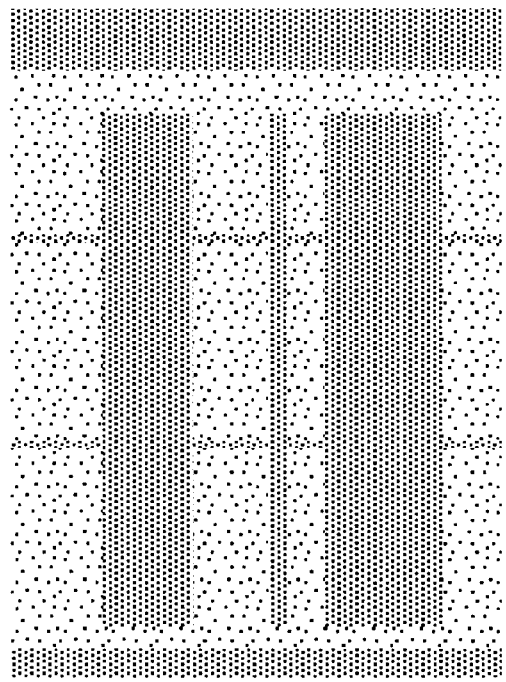
Figure 12:
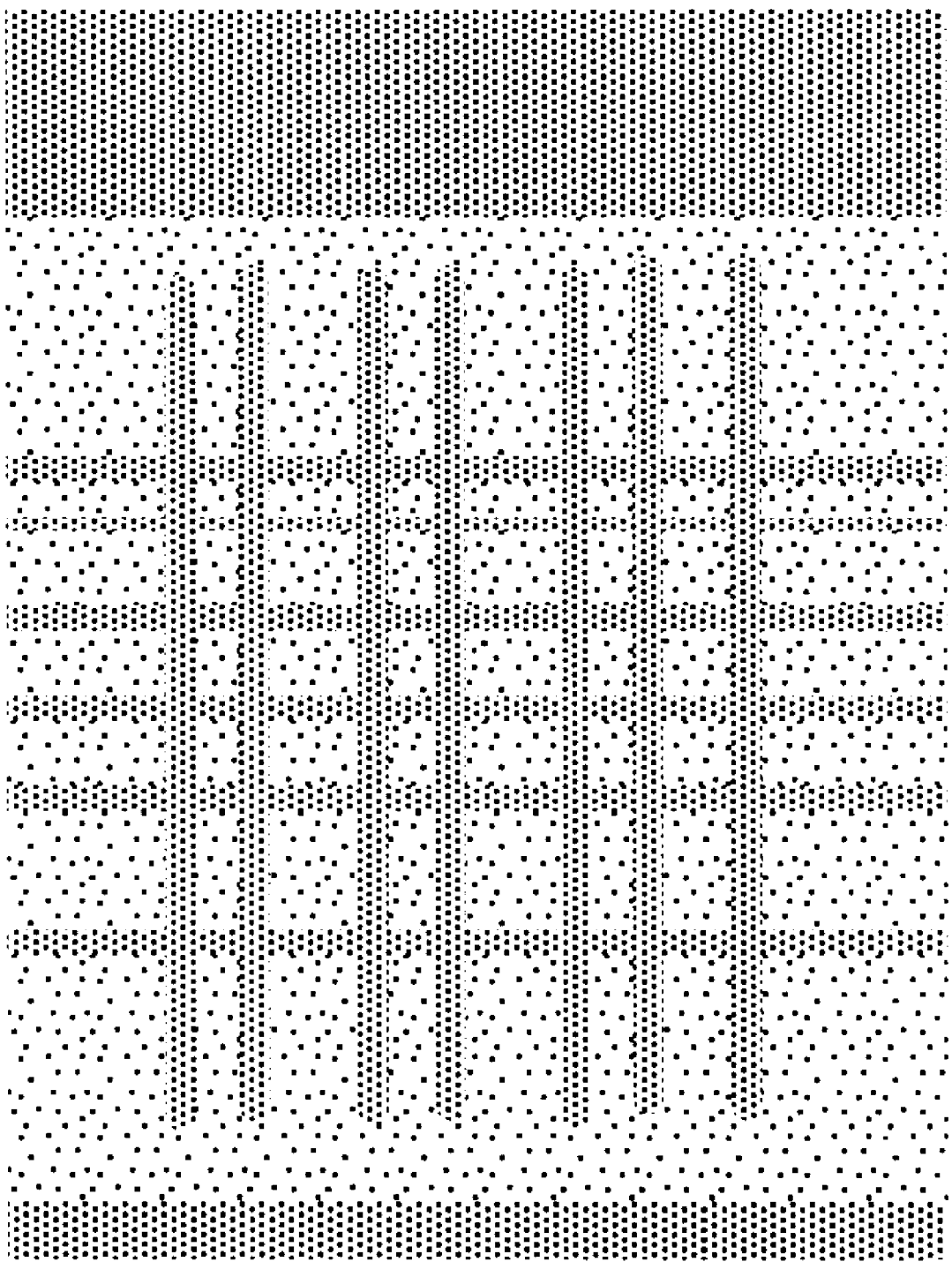
FIG. 12 illustrates a scribe pattern showing both vertical and lateral scribe lines on the flex side of a slider in accordance with an embodiment of the present invention.

Slider crown and camber adjustment as described above is not limited to vertical laser scribes as set forth above. Lateral laser scribes contribute to different characteristics in crown and camber response sensitivity to laser scribe location than do vertical scribes. For example, as shown in FIG. 6, for vertical scribes there is a strong location dependency for camber and weak location dependency for crown. Similarly, it is expected that for lateral scribes, there is a strong location dependency for crown and a weak location dependency for camber. The admissible range of simultaneous crown and camber adjustment as shown in the example of FIG. 7 can be augmented with the inclusion of both lateral and vertical scribe patterns and their combination. Two patterns of vertical laser scribes on the flex side of a slider are illustrated in FIGS. 11(a) and 11(b). The two lateral lines extending across the surface came from diamond scribing conducted prior to the formation of the laser scribes. This surface treatment acts to provide surface stress for subsequent controlled release by laser scribing and is described in U.S. application Ser. Nos. 09/253,671 and 09/277,862, each of which is hereby incorporated by reference in its entirety. An example pattern showing both vertical and lateral scribe lines is illustrated in FIG. 12.

Measuring curvature and forming the laser scribes may be made using a variety of methods as known in the art. U.S. Pat. Nos. 6,075,604 and 6,108,170 describe certain measuring curvature and forming scribes and each is hereby incorporated by reference in its entirety. Scribes may be made using a variety of systems, including, but not limited to pulsed laser, continuous laser, diamond or other hard material tool, or other system that modifies the surface stress of the slider. In addition, the scribes may take a variety of forms including, but not limited to a continuous line, a dotted line, a series of line segments, or curved path along the slider surface.

Co-pending U.S. patent application Ser. No. 09/916,851, entitled "Control of Twist, Crown and Camber for Sliders Using Location Sensitive Scribing," relates to adjusting slider curvature and is hereby incorporated by reference in its entirety. Co-pending U.S. Patent Application Serial No. Ser. No. 09/916,856, entitled "Enhanced Twist Adjust Range With Scribed Lines for Slider Curvature Adjust," also relates to adjusting slider curvature and is hereby incorporated by reference in its entirety.

It will, of course, be understood that modifications of the present invention, in its various aspects, will be apparent to those skilled in the art. For example, while mechanical scribes and laser scribes may be used as discussed above, other types of scribes and/or methods of influencing surface stresses may also be applied to embodiments of the present invention. In addition, embodiments may be applicable to individual sliders and/or sliders attached together in rows. Additional embodiments are possible, their specific features depending upon the particular application.

What is claimed:

1. A method for adjusting the curvature of a slider comprising:
   providing a first slider including an air bearing surface and a back surface opposite the air bearing surface, measuring the camber and crown of the first slider;

making a plurality of scribes at positions on the back surface of the first slider;

measuring change in camber and crown due to each scribe on the first slider;

recording the scribe position and change in crown and camber per position in a data structure;

providing a second slider including an air bearing surface and a back surface opposite the air bearing surface;

measuring the camber and crown of the second slider;

determining a desired amount of change in crown and camber;

selecting scribe positions based on information from the data structure so that the desired amount of change in crown and camber will be obtained; and scribing the back surface of the second slider at the selected scribe positions.

2. A method as in claim 1, wherein the scribes are made using a laser.

3. A method as in claim 1, wherein the scribes are made using a system selected from the group consisting of pulsed laser, a continuous laser, and a mechanical scribe.

4. A method as in claim 3, wherein said mechanical scribe includes scribes made using a tool selected from the group consisting of a diamond tool, a carbide tool, and a metal tool.

5. A method as in claim 1, wherein the scribes are made using a method that modifies the surface stress of the slider.

6. A method as in claim 1, wherein at least one of said scribes is made up of a plurality of dots extending along a line.

7. A method as in claim 1, wherein each scribe is formed to extend in a path selected from the group consisting of a straight path and a curved path.

8. A method as in claim 1, further comprising:

measuring the crown and camber change on the second slider after scribing the back surface of the second slider at the selected scribe positions;

recording into the data structure the crown and camber change per scribe on the second slider;

determining an additional desired amount of change in crown and camber;

selecting additional scribe positions based on information from the data structure so that the additional desired amount of change in crown and camber will be obtained; and forming additional scribes on the back surface of the second slider at the selected additional scribe positions.

9. A method as in claim 8, comprising, after forming additional scribes, measuring the change in crown and camber per additional scribe and recording into the data structure change in crown and camber per additional scribe position.

10. A method as in claim 1, wherein the first and second sliders each include a leading edge and the scribes are formed substantially perpendicular to the leading edge.

11. A method as in claim 10, wherein the second slider include at lease one scribe formed parallel to the leading edge.

12. A method as in claim 1, further comprising introducing at least one mechanical scribe into the back surface of the slider prior to making the plurality of scribes on the back surface of the first slider.

13. A method as in claim 12, further comprising lapping the air bearing surface after introducing the at least one mechanical scribe into the back surface and prior to making the plurality of scribes on the back surface of the first slider.

14. A method as in claim 1, wherein after the scribing the back surface of the second slider, no additional scribes are made on back surface of the second slider.

15. A method as in claim 1, wherein the making a plurality of scribes at positions on the back surface of the first slider includes forming vertical and horizontal scribes.

16. A method as in claim 15, wherein the scribing the back surface of the second slider at the selected scribe positions includes forming vertical and horizontal scribes.

17. A method for adjusting slider curvature comprising:

providing a first row of sliders, measuring the camber and crown of the first row of sliders;

making scribes at selected positions on the first row of sliders;

measuring change in camber and crown due to the scribes made on the first row of sliders;

recording in a data structure the selected positions and the change in crown and camber per selected position;

providing a second row of sliders;

measuring the camber and crown of the second row of sliders;

determining a desired amount of change in crown and camber on the second row of sliders;

selecting scribe positions based on information from the data structure so that the desired amount of change in crown and camber will be obtained; and scribing the second row of sliders at the selected scribe positions.

18. A method as in claim 17, further comprising after scribing the second row of sliders, measuring the change in crown and camber and recording the change in crown and camber per selected scribe position into the data structure.

19. A method as in claim 17, wherein the scribing the second row of sliders at the selected scribe positions is carried out using a laser scribing technique.

20. A method for adjusting slider curvature as in claim 17, wherein after the scribing the second row of sliders at the selected scribe positions, no additional scribes are made on the second row of sliders.

21. A method for adjusting slider curvature as in claim 17, further comprising:

after the scribing the second row of sliders at the selected scribe positions, measuring changes in crown and camber at the selected scribe positions on the second row of sliders;

recording into the data structure the selected scribe positions and changes in crown and camber at the selected scribe positions on the second row of sliders to obtain a revised data structure;

selecting additional scribe positions for the second row of sliders based on information from the revised data structure so that a second desired amount of change in crown and camber is obtained; and scribing the second row of sliders at the additional scribe positions.

22. A method for adjusting slider curvature as in claim 17, wherein the making a plurality of scribes at positions on the first row of sliders includes forming vertical and horizontal scribes.

23. A method for adjusting slider curvature as in claim 22, wherein the scribing the second row of sliders at the selected scribe positions includes forming vertical and horizontal scribes.

24. A method for adjusting the curvature of a slider using a multiple installment process, comprising:

providing a first slider including an air bearing surface and a back surface opposite the air bearing surface;

measuring the camber and crown of the first slider;

making a plurality of scribes at positions on the back surface of the first slider;

measuring change in camber and crown due to each scribe on the first slider;

recording the scribe position and change in crown and camber per position in a data structure;

providing a second slider including an air bearing surface and a back surface opposite the air bearing surface;

measuring the camber and crown of the second slider;

determining a final target camber and a final target crown and determining a total change required in camber and crown to achieve the final target camber and final target crown;

determining a first installment target for camber and a first installment target for crown, wherein the first installment targets for camber and crown are less than the total change required in camber and crown to achieve the final target camber and the final target crown;

selecting first installment scribe positions based on the first installment target for camber and the first installment target for crown;

scribing the back surface of the second slider at the first installment scribe positions;

measuring camber and crown after scribing the back surface of the second slider at the first installment selected scribe positions;

recording the first installment scribe position and change in camber and crown per first installment scribe position in the data structure;

determining a second installment target for camber and a second installment target for crown;

selecting second installment scribe positions based on the second installment target for camber and the second installment target for crown; and scribing the back surface of the second slider at the second installment scribe positions.

25. A method for adjusting the curvature of a slider using a multiple installment process as in claim 24, wherein the second installment target for camber is equal to the final target camber and the second installment target for crown is equal to the final target crown.

26. A method for adjusting slider curvature in a single installment process, comprising:

measuring the camber and crown of a first row of sliders;

making scribes at selected positions on the first row of sliders;

recording in a data structure the selected positions and the change in crown and camber per selected position;

measuring the camber and crown of a second row of sliders;

determining a desired amount of change in crown and camber on the second row of sliders;

selecting scribe positions based on information from the data structure so that the desired amount of change in crown and camber will be obtained; and scribing the second row of sliders at the selected scribe positions;

wherein after the scribing the second row of sliders at the selected scribe positions, no additional scribing is carried out on the second row of sliders.

* * * * *